United States Patent [19]

Lockshin

[11] 4,232,483
[45] Nov. 11, 1980

[54] HINGED LOUVERED WINDOW SHADE DEVICE

[76] Inventor: Robert Lockshin, 2025 NE. 154 St., North Miami Beach, Fla. 33162

[21] Appl. No.: 944,337

[22] Filed: Sep. 21, 1978

Related U.S. Application Data

[63] Continuation of Ser. No. 754,558, Dec. 27, 1976, abandoned, which is a continuation-in-part of Ser. No. 659,599, Feb. 20, 1976, abandoned.

[51] Int. Cl.² .............................................. E05C 7/02
[52] U.S. Cl. ..................................... 49/67; 296/95 R
[58] Field of Search ........................ 49/67, 62, 61, 71; 296/95 R, 96, 97 C; 52/473; D12/181, 182

[56] References Cited

U.S. PATENT DOCUMENTS

| | | | |
|---|---|---|---|
| 2,210,624 | 8/1940 | Kramer | 49/62 |
| 2,349,470 | 5/1944 | Stanfield | 49/67 X |
| 2,497,419 | 2/1950 | Schwartz | 49/71 |
| 2,575,660 | 11/1951 | Geidl | 296/95 R X |
| 2,608,435 | 8/1952 | Buerger | 296/95 R X |
| 2,628,807 | 2/1953 | Lincoln | 296/95 R X |
| 4,023,309 | 5/1977 | Backward | 49/62 |

OTHER PUBLICATIONS

"Chastains Shadow", Brochure For Rear Window Shade.
"Read Window Sun Shade", Brochure For Rear Window Shade.

Primary Examiner—Philip G. Kannan
Attorney, Agent, or Firm—Shapiro and Shapiro

[57] ABSTRACT

A louvered window shade device for hinged installation relative to the rear door windows of automobiles, particularly of the body types commonly known as fast-backs, hatch-backs, etc., wherein substantial portions of the interior compartments thereof are normally exposed to the direct rays of the sun. A pair of top plates are hinged to the top edge portion of a louvered shade and include oppositely outwardly extending clamps for fixed engagement to opposed top side edge portions of the back door, and a pair of similar clamps engage the respective side edges of the door adjacent the lower edge of the louvered shade. The lower clamps each provide a latch device for openable engagement with the louvered shade.

7 Claims, 8 Drawing Figures

HINGED LOUVERED WINDOW SHADE DEVICE

This is a continuation application of Ser. No. 754,558, filed Dec. 27, 1976, now abandoned, which is a continuation-in-part application of Ser. No. 659,599, filed Feb. 20, 1976, now abandoned

BACKGROUND OF THE PRESENT INVENTION

Louvered window shade devices for covering the rear windows of automobiles as conventionally employed generally require the drilling of holes through the body of an automobile to provide a hinged connection thereto. While this is undesirable, it is essential to provide the hinged connection to permit the louvered shade to be pivoted to an open relation to the window for cleaning purposes.

Many automobiles of the types providing large acutely angled rear windows are provided with structural means to mount the rear window and to conceal the peripheral edge connections thereof which heretofore have necessitated the use of hinges and latch means which are bolted directly through holes in the car bodies.

The hinged louvered window shade device of the present invention provides two pairs of clamp means for engagement with the peripheral edge portions of the rear door of an automobile. A first pair includes hinges for attachment to the top edge of the louvered shade and a second pair includes latch means to permit the louvered shade to be selectively pivoted by means of said hinges to an open relation to the window or securely latched in a closed relation thereto.

Therefore, one of the principal objects of the present invention is to provide clamp means for pivotal attachment of a louvered window shade relative to the window in the rear door of an automobile without the necessity of drilling holes in or otherwise defacing the automobile body.

Another principal object of this invention is to provide two pairs of clamp means for clamped engagement with the existing peripheral flange portion of the rear door of an automobile.

A further object of the invention is to provide hinge means carried by a first, top pair of said clamp means for fixed engagement with the top edge portion of the louvered window shade.

Yet another object of the instant invention is to provide latch means fixed relative to a second, lower pair of the clamp means to permit the louvered window shade to be selectively latched in a closed relation to the rear window or unlatched to permit pivotal movement thereof to an open relation to the rear window for cleaning purposes.

DETAILED DESCRIPTION OF THE DRAWINGS

Figure 1:
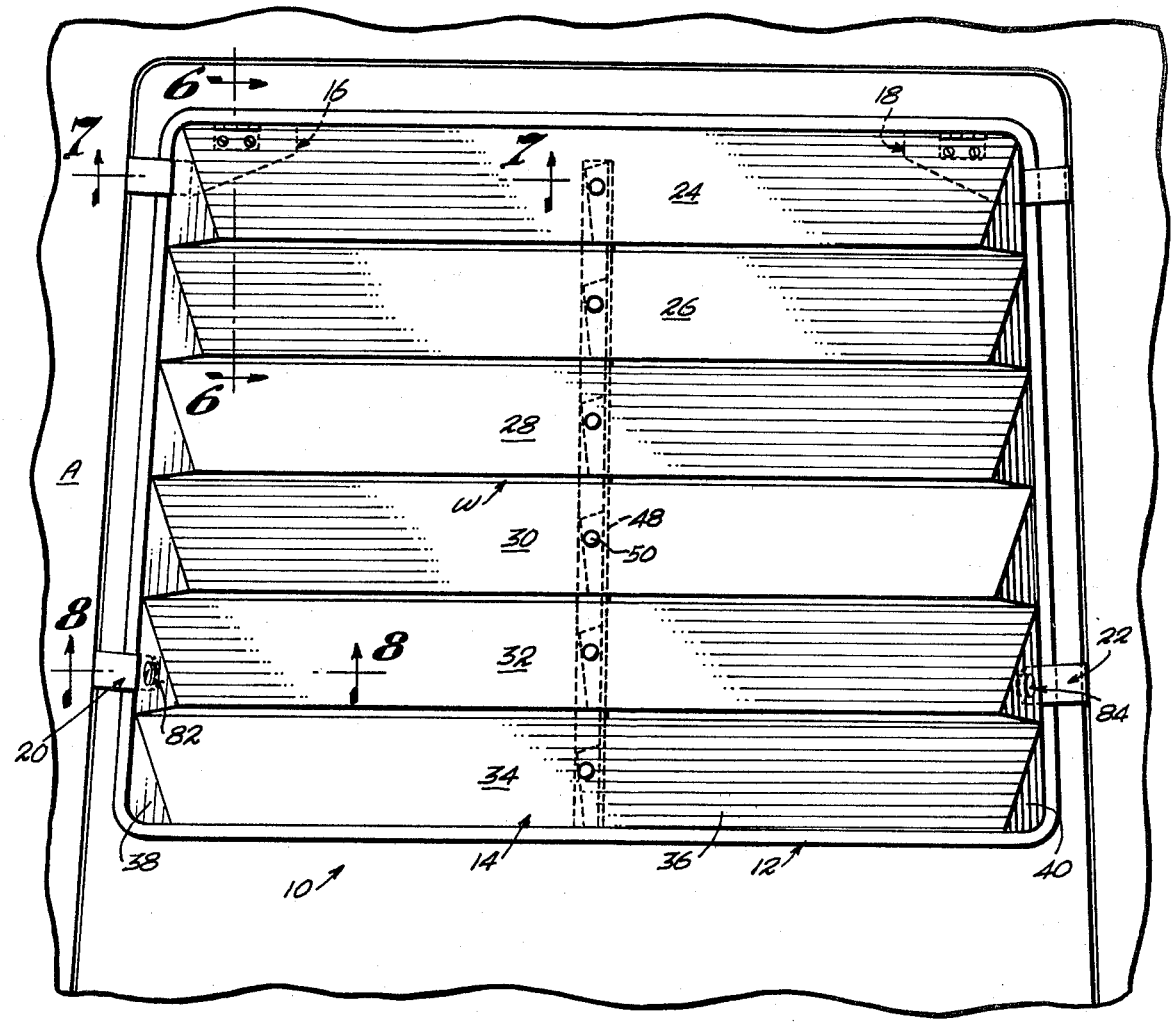
FIG. 1 is a top plan view of a louvered window shade device, installed relative to the rear window of an automobile.
Figure 2:
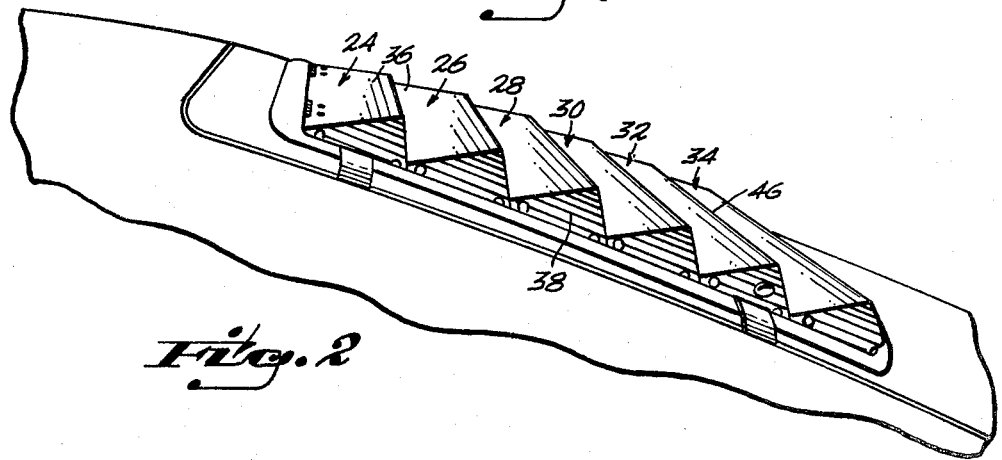
FIG. 2 is a side perspective view of the shade installed as in FIG. 1.

With reference to the drawings in which like reference characters designate like or corresponding parts throughout the various views, and with particular reference to FIGS. 1 and 2, the louvered shade device, indicated generally at 10, is illustrated fixed in a closed relation to the rear window W of an automobile A. The rear window is mounted in a conventional manner, surrounded by a metal trim strip 12 such as is commonly employed on many cars manufactured in the United States. Trim strips of this type are semi-rigid and provide no resiliency.

Figure 3:
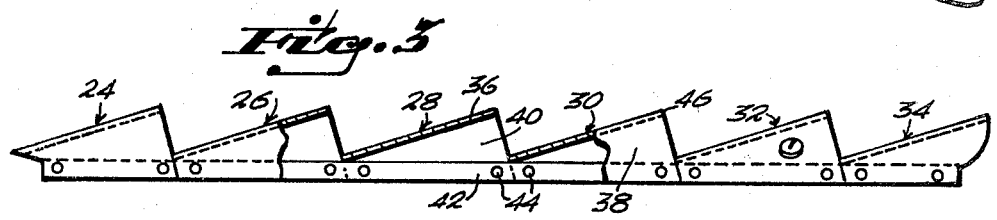
FIG. 3 is a side elevational view of the main body portion of the louvered window shade with parts broken away for illustration purposes.

The louvered window shade device 10 includes a main body assembly 14 and a pair of top, side mounting plate assemblies 16 and 18 and a pair of lower, side mounting assemblies 20 and 22. The main body assembly 14 is comprised of a plurality of louvers 24, 26, 28, 30, 32 and 34. Each louver includes a top wall 36 and generally triangular downwardly angled, opposed end walls 38 and 40. As best illustrated in FIG. 3, the lower edges of the end walls 38 and 40 of louvers 24 through 34 are aligned and interconnected by respective tie bars such as 42 by rivets 44. In this manner, the plurality of louvers 24 through 34 are held in a rigid, generally rectangular assembly.

As is generally conventional with louvered window shades of this nature, the angles of end walls 38 and 40 and the acute angle of rear window W are correlated to provide a minimum of obstruction to the driver's view through the rear window W via the open trailing ends 46 of the louvers. The top louver walls 36 will all be positioned in generally horizontal, parallel planes. A center brace 48, generally bisecting the lengths of louvers 24 through 34, is fixed to the underside of each louver by a rivet 50.

Figure 4:
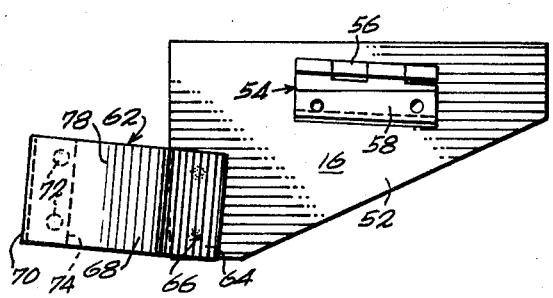
FIG. 4 is a top plan view of one of the top clamp and hinge assemblies of the present invention.
Figure 6:
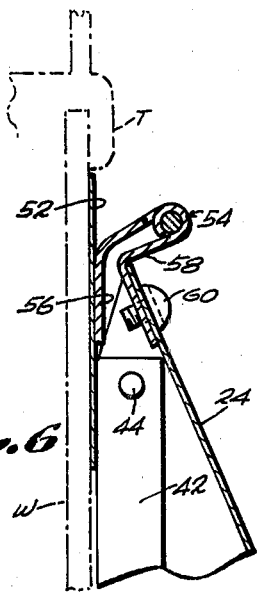
FIG. 6 is a vertical cross sectional view taken along line 6—6 of FIG. 1.
Figure 7:
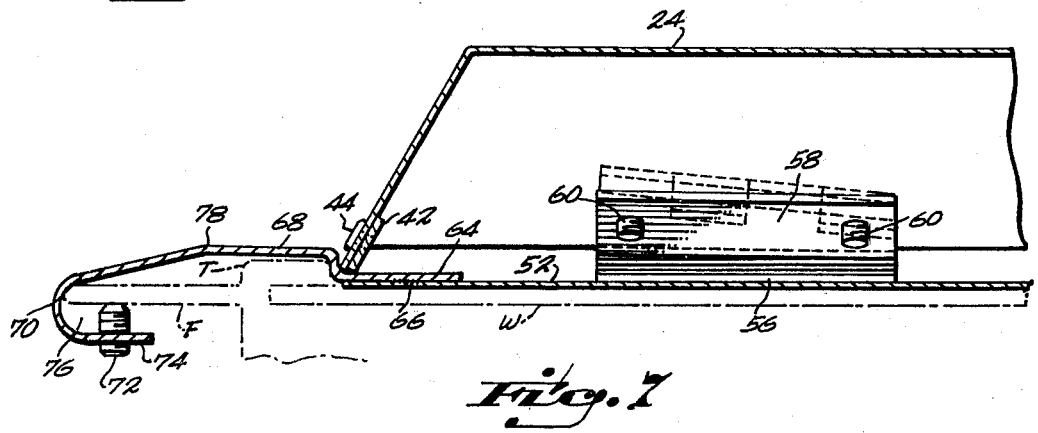
FIG. 7 is a transverse cross sectional view taken along line 7—7 of FIG. 1.

Mounting means for the main body assembly 14 is provided by the pair of top, side mounting plate assemblies 16 and 18 and the pair of lower, side mounting assemblies 20 and 22. Each of the mounting plate assemblies such as 16, FIGS. 4, 6 and 7, is comprised of a base plate 52 having a hinge 54 fixed to its outer face in a generally horizontal position. A first hinge leaf 56 is fixed to plate 52 as by spot welding and a pivotal leaf 58 of hinge 54 is fixed by screws 60 to the top edge portion of the top louver 24.

A generally, laterally extending clamp member 62 includes an inner flange 64 fixed as by spot welding 66 to the outer face of base plate 52. As best illustrated in FIG. 7, an outwardly extending clamp portion of member 62 comprises an extension flange 68 terminating in a C-shaped end portion 70 to engage over the edge of the peripheral door flange F. A pair of set screws 72 are threaded through the under flange 74 of end portion 70 to clamp the flange F in the bight 76 of the C-shaped end portion 70. Extension flange 68 is arched as at 78 to clear the metal trim strip, generally illustrated at T.

Therefore, it can be seen that when the two top mounting plate assemblies 16 and 18 are mounted relative to the opposed top corners of the window W and louvered shade device 10 as in FIG. 1, with the base plate 52 positioned against the window glass W, the shade device 10 is fixed in place for hinged pivotal movement relative to window W.

Figure 5:
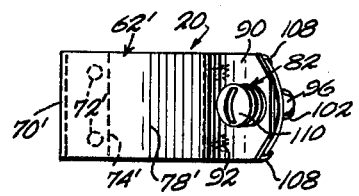
FIG. 5 is a top plan view of one of the lower clamp and latch assemblies of the invention.
Figure 8:
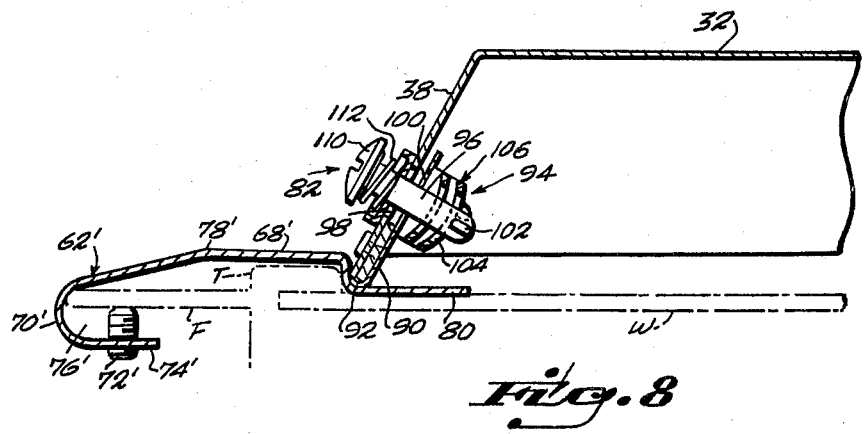
FIG. 8 is a transverse cross sectional view taken along line 8—8 of FIG. 1.

With reference to the pair of lower, side mounting assembly 20 and 22, of FIGS. 5 and 8, each such as 20 includes an outwardly extending clamp portion 62' which is identical in structure and function with clamp portion 62 of the top mounting plate assemblies 16 and 18. To avoid repetition, all corresponding parts of 62' have been given prime designations. Extending inwardly of clamp portion 62' is a downwardly, inwardly turned flange 80 which lies against the outer surface of window W.

Identical latch devices 82 and 84, FIG. 1, are fixed to flange 80 of the respective mounting assemblies 20 and 22. The latch devices such as 82 serve to selectively lock and unlock the main body assembly 14 relative to window W. In the unlocked condition the assembly 14 is free for pivotal movement about the hinges 54 to an open position. The latch 82 may be any of a variety of commercially available types, one of which is generally illustrated in FIG. 8. An extension flange 90 is fixed at 92 as by welding to the flange 80 and is angled upwardly, inwardly of and at an angle complementary to the angle of end louver wall 38. A spring type keeper device 94 includes a latch pin 96 extending through respective holes 98, 100 in end wall 38 and extension flange 90. The inner end of pin 96 is provided with a pair of oppositely extending wings 102 (one shown in FIG. 8) which are adapted to pass through slots 104 in keeper means 106, clamped as at 108 (FIG. 5) to extension flange 90, in one position only. When latch pin 96 is in the inserted position of FIG. 8 and rotated through approximately 90°, the main body assembly 14 is locked to the door flange F. Latch pin 96 is provided with an outer slotted head 110 for the reception of a suitable tool and is preferably spring-loaded as at 112.

Therefore, when the latch pins 96 are removed from the lower mounting assemblies 20 and 22, the louvered shade device 10 can be pivoted upwardly to permit cleaning of the window W, for example, and when the device 10 is moved to the closed position and the latch pins 96 are inserted and actuated as above described, the louvered shade device 10 is firmly locked in a closed position.

What is claimed is:

1. A louvered window shade device for mounting relative to the window in the rear door of an automobile comprising:

a main body assembly having a top edge portion and a lower portion and being comprised of a plurality of interconnected horizontally disposed louvers, each louver including an elongated transverse top wall and a pair of opposed end walls, mounting means including a pair of top mounting assemblies and a pair of lower mounting assemblies, each of said pair of top mounting assemblies including hinge means connecting to said top edge portion and clamp means for fixed engagement relative to the existing peripheral door flange, and each of said pair of lower mounting means including clamp means for fixed engagement relative to the door flange and latch means for selective engagement and disengagement relative to said lower portion, each of said latch means comprising a latch pin connecting a lower mounting means and an end wall of one of said louvers, said latch pin being rotatable between a latched position at which the latch pin extends between the associated mounting means and louver end wall and an unlatched position at which the latch pin is removable from between the associated mounting means and louver end wall.

2. The device as defined in claim 1 wherein each of said pair of top mounting assemblies comprises a base plate for engagement against one upper corner portion of the outside surface of the window, with said hinge means and clamp means of the top mounting assembly being fixed to said base plate.

3. The device as defined in claim 1 wherein each of said clamp means of said top and lower mounting assemblies includes an outwardly extending clamp portion terminating in a C-shaped end portion to engage around the existing edge of the door flange and set screw means in said C-shaped end portion to fix said clamp means relative to the door flange.

4. The device as defined in claim 3 wherein each of said outwardly extending clamp portions is arched to provide a clearance for the existing trim strip extending around the periphery of the window.

5. The device as defined in claim 1 wherein said plurality of louvers are interconnected by a pair of tie bars, fixed as by rivets along the lower edge portions of the respective aligned end walls of said louvers.

6. The device as defined in claim 5 including a center brace member, fixed as by rivets to each of said louvers intermediate said end walls.

7. A louvered window shade device for mounting relative to an automobile rear door window that is generally rectangular and that has a peripheral trim strip, comprising a generally rectangular main body assembly dimensioned to fit within the trim strip and cover the window and including a plurality of interconnected horizontally disposed louvers, mounting means for the main body assembly and including an upper pair of clamp means and a lower pair of clamp means, the clamp means of each pair being shaped and positioned to clamp about a peripheral flange of the door adjacent to opposite sides of the main body assembly and being arched to extend over the trim strip, the upper pair of clamp means having plate means fixed thereto and positioned to engage upper corner regions of said window, hinge means mounted on said plate means and connected to an upper region of the main body assembly to permit the main body assembly to be pivoted between opened and closed positions relative to the window, the lower pair of clamp means supporting latch means for holding the main body assembly closed relative to the window, and each of the lower pair of clamp means having a flange positioned to engage the window.

* * * * *